Figure 1:
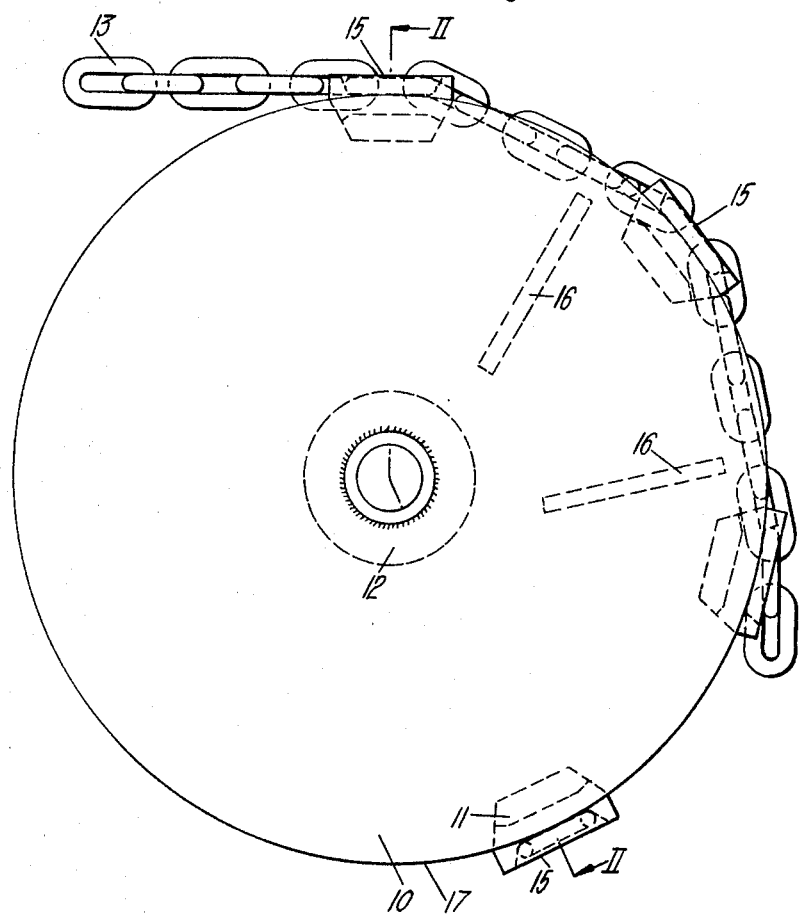

Aug. 9, 1966 A. C. LOW 3,265,191
CONVEYORS
Filed May 12, 1964 3 Sheets-Sheet 1

Inventor
ALEXANDER C. LOW
By Young & Thompson
Attorneys

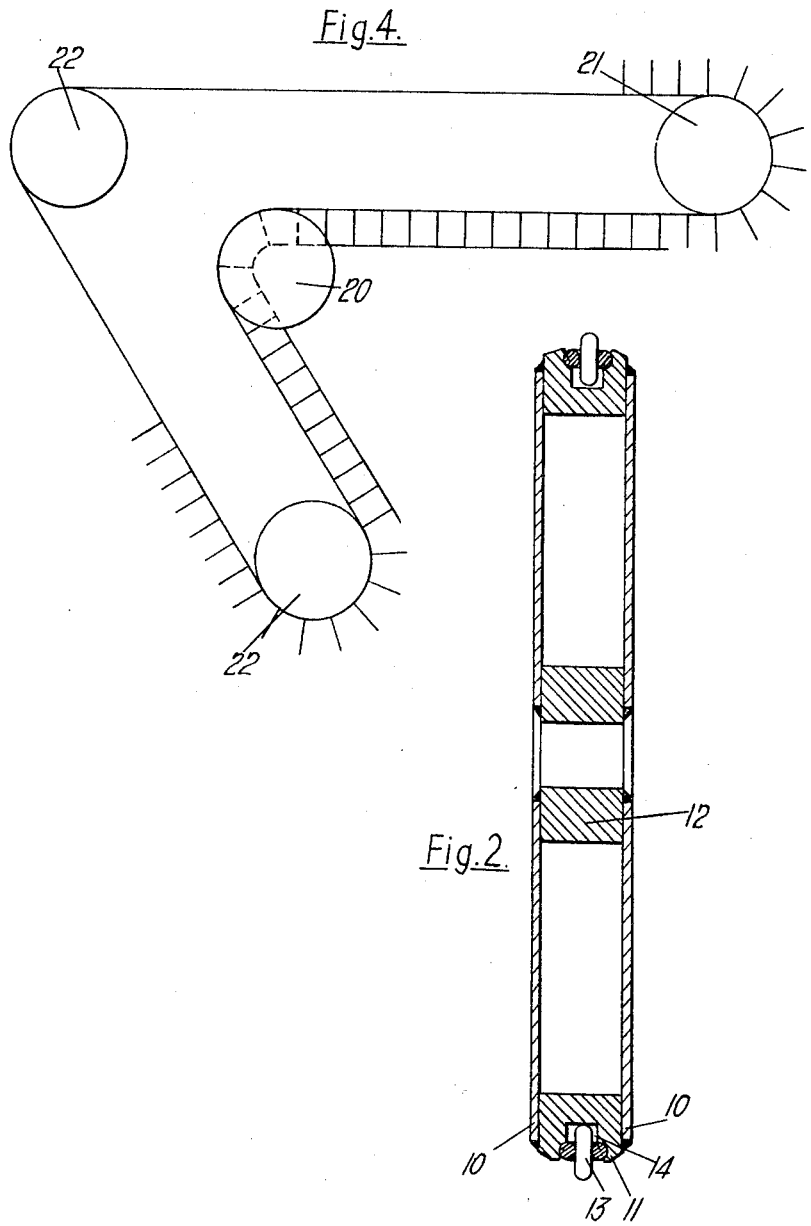

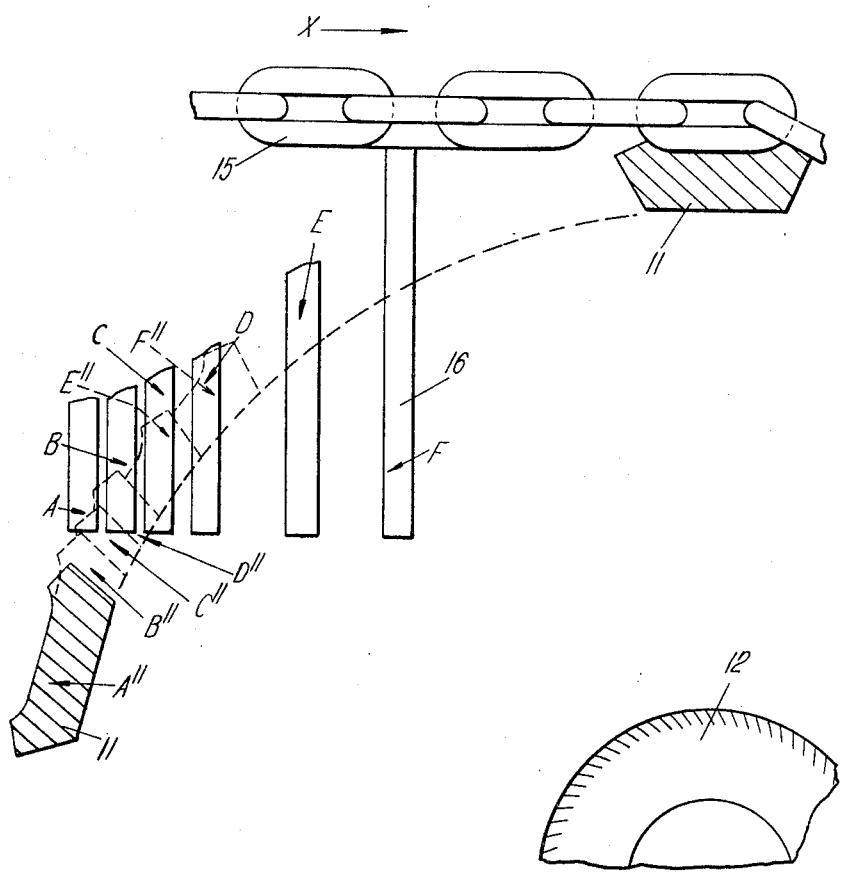

United States Patent Office 3,265,191
Patented August 9, 1966

3,265,191
CONVEYORS
Alexander C. Low, Glasgow, Scotland, assignor to Mavor & Coulson Limited, a British company
Filed May 12, 1964, Ser. No. 366,832
Claims priority, application Great Britain, May 23, 1963, 20,528/63
1 Claim. (Cl. 198—171)

This invention relates to sprocket wheels and is particularly but not exclusively applicable to endless chain conveyors in which the conveying means comprises flights attached to a side of an endless chain, the other side of the chain being engaged where appropriate by driving and idling sprockets, and the flights convey coal or other minerals by pushing same along a surface to a required station. This type of conveyor generally has all of the flights in the same plane when it is known as a "round-the-houses" conveyor.

Hitherto, in machines employing such a conveyor the endless chain is mounted on at least one idler and one driving sprocket which engage the inside of the chain whereby the flights extend radially outwards from either sprocket when the chain passes therearound. Thus, having regard to the direction of travel of the conveyor and the position of the flights, any sprocket supporting the chain can only be positioned on one side of the chain. For example, it would not be possible to have a "round-the-houses" conveyor which defined a re-entrant curve, for example a T-shape or a right angle.

It is an object of the present invention to provide a sprocket which can be positioned on the flight side of a "round-the-houses" conveyor chain and guide or drive same.

According to the present invention there is provided a sprocket wheel adapted for rotation about an axis, the wheel including a plurality of blocks equiangularly spaced relative to the axis and being equidistant from said axis, and connecting means for locating said blocks in position relative to said axis.

Further according to the present invention there is provided in an endless chain conveyor including an endless chain having pitched flights thereon which extend from one side thereof and have a free end, a sprocket wheel adapted for rotation about an axis, the wheel including a plurality of blocks equiangularly spaced relative to the axis, connecting means for locating said blocks in position relative to said axis, and a central boss, the sprocket being mounted on the flight carrying side of the chain and being so dimensioned that the pitch of the flights is the same as the pitch of the blocks, and the radial distance between the outer surface of the central boss and the blocks is greater than the distance between the chain and the free ends of the flights whereby, during a conveying operation, the flights enter and leave the sprocket unrestricted.

An embodiment of the invention will now be described, simply by way of example, with reference to the accompanying drawings in which, FIG. 1 is a diagrammatic elevation of a sprocket according to the invention;
FIG. 2 is a section on the line II—II in FIG. 1;
FIG. 3 is a diagrammatic multi-position elevation;
FIG. 4 shows a sprocket according to the invention positioned in a "round-the-houses" chain conveyor.

Referring to the drawings, a sprocket includes a boss 12 which is co-axial with the axis of rotation of the sprocket. The boss 12 is interposed between two plates 10, maintaining them in spaced parallel relationship, the plates 10 being welded to each end face of the boss 12. In the embodiment, the plates 10 are circular discs. A plurality of blocks 11 are equiangularly disposed around a pitch circle 17 which is concentric with the axis of the boss 12, these blocks constituting teeth for engagement with a chain 13. The blocks 11 have a longitudinal slot 14 and a transverse slot 15 which form seatings for the links of the chain 13. Thus, the two plates 10 and the boss 12 define an annular space, the blocks 11 being located at the periphery of and between said plates 10. The pitch of the blocks 11 is a multiple of the pitch of the chain 13 for which the sprocket is intended. The chain 13 carries flights 16, mounted perpendicularly on one side thereof, these flights having the same pitch as the blocks 11. The dimensions of the sprocket are such that the radial distance between the outer surface of the boss 12 and the pitch circle 17 is greater than the length of the flights 16.

In operation, as the chain 13 engages the blocks 11, since the blocks are suitably pitched, the flights 16 enter the annular space unrestricted. FIG. 3 shows the positions of a flight 16 and a block 11 as said flight is about to enter the annular space, the direction of chain travel being indicated by the arrow X. References A to E represent the positions of a flight 16 at several successive instances in time and the references A″ to E″ represent the positions of the corresponding block 11 at the same instances in time.

A sprocket according to the present invention can be positioned in a "round-the-houses" chain conveyor as shown in FIG. 4, the sprocket being indicated at 20. The other sprockets 21, 22 and 23 may also be sprockets as herein described if desired since the absence of flights in no way affects the performance of the sprocket.

In a modification of the invention the plates 10 are replaced by a plurality of pairs of radial spokes which extend from the central boss 12, each pair being in superposed relationship and supporting one of the blocks therebetween. This modification allows the sprocket to be used with a "round-the-houses" conveyor in which the breadth of flights is greater than the thickness of the sprocket wheel. Further, the sprocket may be mounted, either as an idler or driving sprocket, in any known manner; for example, the plates 10 may have holes co-axial with the boss 12 in order that the sprocket may be mounted on a shaft located in the boss 12. The sprocket may be slidably mounted on, or fixed to the shaft.

As a result of the invention a sprocket has been provided which can accommodate a chain carrying pitched outwardly extending members thereon and can support the chain either on the side carrying said outwardly extending members or on its other side depending on the path the chain has to follow.

The invention is also applicable to a sprocket for a conveyor chain having flights attached to both sides of the chain.

Modifications of the invention may be made e.g. the blocks 11 may be supported on a single plate 10 and the blocks 11 may have transverse teeth thereon for engagement with internal teeth on an endless belt.

I claim:

A heavy-duty endless chain conveyor having flights projecting laterally from one side only for pushing material such as coal and the like, the chain having links disposed alternately crosswise to each other, a conveyor sprocket having a central hub, a plurality of blocks equiangularly spaced on a pitch circle relative to the hub and supporting the conveyor chain as it passes therearound, the blocks having recesses on their outer surfaces for seating the links of the chain, the recesses having portions shaped to receive adjacent crosswise links, and a pair of parallel, spaced, coaxial discs supporting the blocks in position relative to the hub, the connecting blocks supporting the chain on said one side of the chain intermediate the flights with said links in said recesses, the pitch of the flights being substantially the same as the pitch of the blocks, whereby the flights can pass through the sprocket and between said discs unrestricted and can carry material therethrough, the flights being of a length less than the sprocket radius.

References Cited by the Examiner

UNITED STATES PATENTS

| | | |
|---|---|---|
| 1,231,856 | 7/1917 | Crane. |
| 2,101,685 | 12/1937 | Nisbet. |
| 2,333,926 | 11/1943 | Hapman _____ 198—168 |
| 2,573,334 | 10/1951 | Hitz _____ 198—173 |
| 2,782,761 | 2/1957 | Martin _____ 119—52 |
| 3,097,735 | 7/1963 | Siciliano _____ 198—171 |

EVON C. BLUNK, *Primary Examiner.*

RICHARD E. AERGERTER, HUGO O. SCHULZ,
*Examiners.*